April 25, 1939.  S. BAXENDALE ET AL  2,155,634
STOCK FEEDING MEANS FOR AUTOMATIC MACHINE TOOLS
Filed June 27, 1938
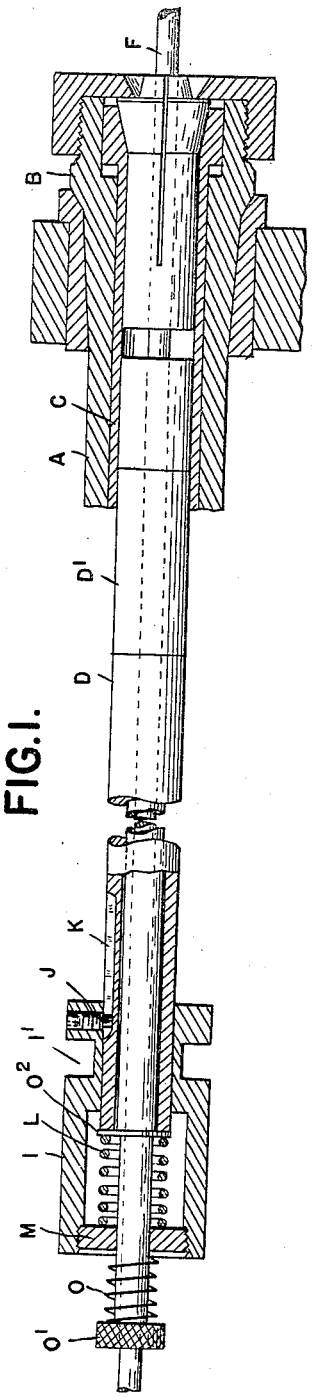
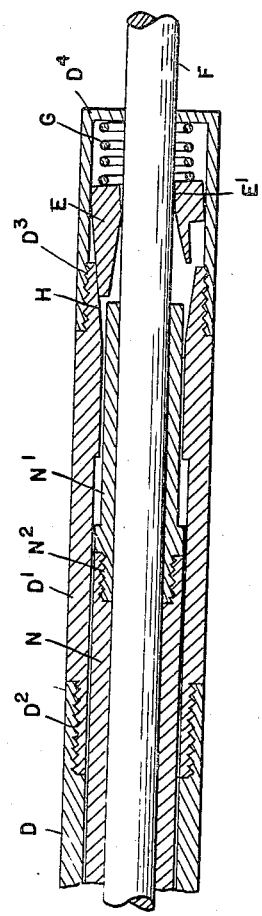
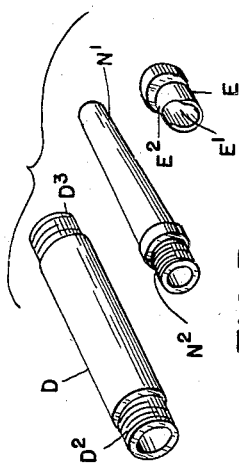
INVENTORS
SAMUEL BAXENDALE
BY JOHN EVASIC
*Whittemore Hulbert & Belknap*
ATTORNEYS Patented Apr. 25, 1939

2,155,634

UNITED STATES PATENT OFFICE 2,155,634

STOCK FEEDING MEANS FOR AUTOMATIC MACHINE TOOLS

Samuel Baxendale, Dearborn, and John Evasic, Detroit, Mich., assignors to Modern Collet & Machine Company, Ecorse, Mich., a corporation of Michigan Application June 27, 1938, Serial No. 216,120

4 Claims. (Cl. 29—61)

The invention relates to stock feeding means for automatic machine tools of that type in which long bars of stock are fed step by step through a revoluble hollow spindle into operative relation to the tool or tools for fashioning the same. The stock is held during the performance of the work by a collet or chuck at the forward end of the hollow spindle, which collet is engaged and released by the operation of a tubular pusher bar extending through the spindle to actuating means at the rear end thereof. The stock is advanced by a feeder within this pusher tube, which is actuated by an inner tube extending to the rear end of the spindle. With certain constructions heretofore used this feeder is a one-way clutch which grips the stock during the forward movement of the actuating tube and releases the stock during the rearward movement thereof. There is also a resilient yieldable element in the feeder actuating mechanism which guards against any breakage of parts when the forward end of the stock is arrested from further movement.

The construction as above described which has heretofore been used, has one serious defect. This is due to the fact that the feeder is a one-way clutch located in an inaccessible position within the spindle. As a consequence, if for any reason it is necessary to withdraw a stock bar from the spindle, there is no means for releasing the feeder clutch so that it will be impossible to move the stock bar rearwardly. On the other hand, the tools and the turret on which they are mounted stand in the path of the forward end of the bar so that it cannot be drawn forward out of the spindle.

It is the object of our invention to obtain a construction such as above described with the additional feature that the feeder clutch can be released so as to permit the withdrawal of the stock bar in a rearward direction. To this end the invention consists in the construction as hereinafter set forth.

In the drawing:

Figure 1 is a central longitudinal section through a spindle of an automatic machine tool to which our improvements are applied;

Figure 2 is an enlarged section of a portion of Figure 1;

Figure 3 is a perspective view of several detached elements of our improved construction.

As illustrated in Figure 1, A is the rotary spindle provided at its forward end with a collet B for chucking the work and which is operated by the tubular pusher bar C extending to the rear of the spindle and is connected to suitable actuating mechanism. D is a tubular member for actuating the feeder E, which latter is located within the hollow spindle slightly in rear of the collet B. The tube D projects beyond the rear end of the spindle A and is connected with mechanism for periodically reciprocating the same. The feeder comprises an annular member which surrounds the stock bar F and is arranged within the forward portion of the tube D. The member E when arranged to be coaxial with the stock bar is freely slidable thereon. If, however, the member E is tilted to have its axis at an angle to the axis of the stock bar, it will firmly grip the latter. Such a tilting is effected whenever the member D is moved forwardly within the spindle A, this being accomplished through the action of a spring G pressing the member E rearwardly, and a cam H on the inner face of the tube D engaging one side of the member E and forcing it radially inward. On the other hand, when the member D is moved rearwardly within the spindle the stock bar F being held stationary by the collet B, the spring G will yield, permitting the member E to reassume its position coaxial with the stock bar and thereby releasing frictional engagement therewith.

With the construction thus far described and through the cooperation of timing mechanism (not shown) the stock bar F is advanced by each forward movement of the tube D; is then clamped by the collet B, after which the tube D is moved rearward which automatically releases the grip of the feeder E and permits it to slide over the stationary stock bar. To avoid any danger of breakage, there is sleeved upon the rear end of the tube D a member I which has a pin J engaging a spline way K in said tube. The rear end of the member I is counterbored to form a recess for receiving a spring L one end of which abuts against the end of the tube D, while the opposite end engages a screw threaded cap M. The member I has an annular groove I' which is engaged by an actuating fork (not shown) through which this member and also the tube D is reciprocated. The tension of the spring L normally holds the pin J at the rear end of the spline way K, but in case of any obstacle to the forward movement of the tube D, this spring will yield permitting the continued movement of the member I. This construction therefore insures, in the normal operation of the machine, a positive forward feeding of the stock bar F a predetermined amount, but at the same time will yield whenever the stock bar is stopped, to avoid breakage.

Inasmuch as the gripping of the stock bar by the feeder E is automatic and occurs whenever the member D moves forward with respect to the stock bar, it will be readily understood that a movement of the stock bar rearward is effectually prevented. Furthermore, as the gripper or feeder E is located within the hollow spindle there is no direct access thereto to release the same if such action is desired. We have therefore devised a construction through which the feeder E can be actuated from outside of the hollow spindle so as to release its engagement with the stock bar, permitting the latter to be drawn rearward out of the machine, the construction being as follows. N is a tubular member arranged within the tube D and surrounding the stock bar F. The forward end of the member N is in proximity to the rear end of the portion of the member E which engages the cam H. Thus, by moving the tube N forward within the spindle it will push the member E out of engagement with the cam H and against the tension of the spring G, thereby permitting a reassumption of the coaxial relation of said member with the stock bar and releasing the latter. The tube N extends to the rear end of the tube D and also through the rear end of the member I to project beyond the same. O is a spring sleeved upon said projecting portion one end abutting against the end of the member I, and the opposite end against a collar O' on the tube N. This will normally draw the tube N rearward out of engagement with the member E. Such movement is limited by a second collar $O^2$ on the tube N arranged within the chamber in the member I between the spring L and the end of the tube D.

The construction being as above described, the operation is as follows. The stock bar F is inserted through the rear end of the tube N and moved forward into engagement with the feeder E. Reciprocatory movement is then imparted to the tube D through the medium of the member I and during each forward movement the member E under the pressure of the spring G and action of the cam H will grip the stock bar so as to carry it also forward. Upon the return movement of the tube D the cam H will withdraw from the member E sufficiently to permit it to reassume a coaxial relation to the stock bar and to thereby release its gripping engagement. In the meantime, the collet B has gripped the bar F and will hold it against rearward movement. These operations are repeated with each reciprocation of the member I and tube D, so that the stock is advanced step by step in timed relation to the operation of the automatic machine. If the stop which determines the length of blank to be projected beyond the collet B should arrest movement of the stock bar before completion of the forward movement of the member I, then the spring L will yield permitting the tube D to stop with the stock bar. This same action will take place if through any cause, the forward movement of the stock bar is obstructed.

Whenever it is necessary to remove the stock bar from the spindle the collar or head O' at the rear end of the tube N can be manually pressed forward which will cause the forward end of this tube to engage the rear end of the member E moving it forward out of engagement with the cam H. This permits the member E to assume a coaxial position in relation to the stock bar, as previously described, with the result that the gripping action on the stock bar is released, permitting it to be drawn rearward out of engagement with the spindle.

To adapt the feed mechanism for operation upon stock bars of different diameters, it is formed of a plurality of exchangeable elements shown in detail in Figure 3. These include the feeder E which is exchanged for each size of stock bar and has a bore E' corresponding to the diameter of said bar. The rear or tail portion $E^2$ of this member is slightly eccentric so as to give clearance for a tilting action by the cam H. The tubular member N is also provided with an exchangeable forward end portion N' which has a bore corresponding to the size of the stock bar to hold the latter concentric within the tube D when it is gripped by the member E. This member N' has a threaded rear end $N^2$ for engagement with the threaded socket at the forward end of the member N. The tube D has a detachable portion D' the forward end of which is internally flared to form the cam H and this member is also threaded at its opposite ends as indicated at $D^2$ and $D^3$ for engagement respectively with the tube D and a cap member $D^4$. The latter encloses the member E and the spring G, as well as forming an abutment for the forward end of said spring. These several detachable elements facilitate the adjustment of the feeder for operation upon stock bars of different diameters.

What we claim as our invention is:

1. The combination with a hollow spindle, of a stock feeder within said spindle comprising a reciprocatory tubular pusher member, a one-way clutch at the forward end of said pusher member in rear of the forward end of said spindle for automatically gripping the stock bar when the pusher is moved forward in the spindle, and means operable from the outside at one end of said hollow spindle for releasing said clutch from engagement with the bar to permit rearward withdrawal of the latter from the hollow spindle.

2. The combination with a hollow spindle, of a stock feeder within said spindle comprising a reciprocatory tubular pusher member, an annular member at the forward end of said pusher member surrounding the stock bar and adapted to grip the same when tilted at an angle, a cam on said pusher member for effecting the tilting of said annular member, resilient means for yieldably pressing said annular member into engagement with said cam, and a member within said tubular pusher member operable to move said annular member out of engagement with said cam.

3. The combination with a hollow spindle, of a stock feeder within said spindle comprising a reciprocatory tubular pusher member, an annular member at the forward end of said pusher member surrounding the stock bar and adapted to grip the same when tilted at an angle, a cam on said pusher member for effecting the tilting of said annular member, resilient means for yieldably pressing said annular member into engagement with said cam, a tubular member within said tubular pusher member extending rearward beyond the same and forward into proximity to said annular member being adapted when moved forward to disengage said annular member from its gripping engagement with the stock bar, and resilient means for normally holding said last mentioned tubular member out of engagement with said annular member.

4. The combination with a hollow spindle, of a stock feeder within said spindle comprising a reciprocatory tubular pusher member, an annular member at the forward end of said pusher member surrounding the stock bar and adapted to grip the same when tilted at an angle, a cam on said pusher member for effecting the tilting of said annular member, resilient means for yieldably pressing said annular member into engagement with said cam, a tubular member within said tubular pusher member extending rearward beyond the same and forward into proximity to said annular member being adapted when moved forward to disengage said annular member from its gripping engagement with the stock bar, resilient means for normally holding said last mentioned tubular member out of engagement with said annular member, and an exchangeable section at the forward end of said last mentioned tubular member having a bore corresponding to the diameter of the stock bar to hold the latter concentric within said tubular pusher member, said annular member being also exchangeable and having a bore corresponding to the diameter of the stock bar.

SAMUEL BAXENDALE.
JOHN EVASIC.